Nov. 6, 1962 R. R. MYERS 3,062,139
METHOD OF AND MEANS FOR PRODUCING PRINTING PLATES
Filed June 19, 1959
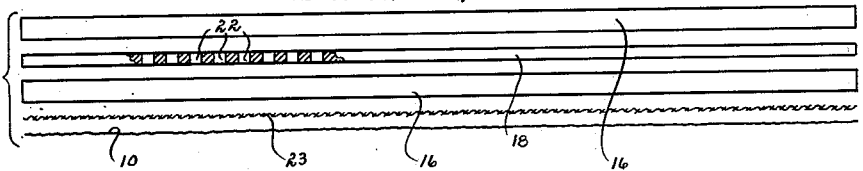
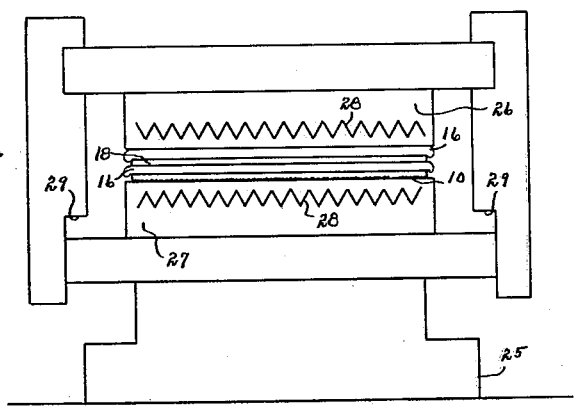
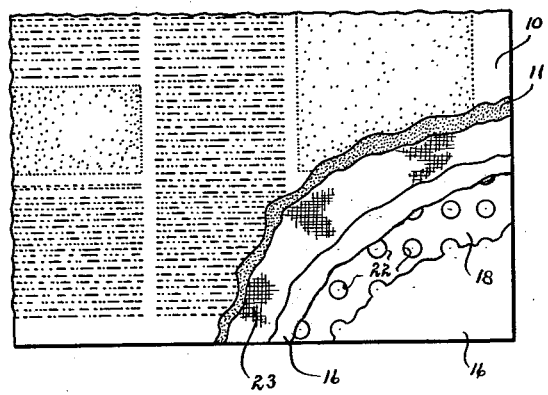
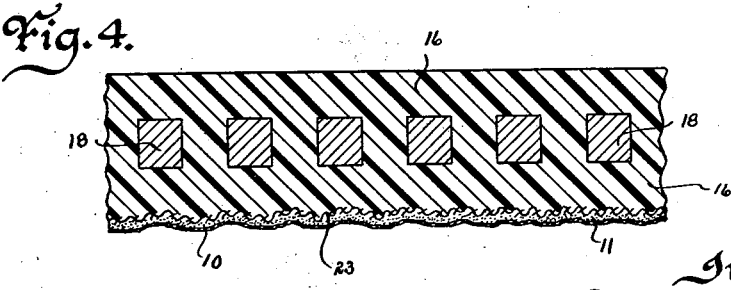
Inventor
Robert R. Myers
by M. Talbert Dick
Attorney
Witness
Edward O. Seeley

United States Patent Office 3,062,139
Patented Nov. 6, 1962

3,062,139
METHOD OF AND MEANS FOR PRODUCING
PRINTING PLATES
Robert R. Myers, 561 Washington, Chicago, Ill.
Filed June 19, 1959, Ser. No. 821,563
11 Claims. (Cl. 101—401.1)

This invention relates to the art of manufacturing printing plates and more particularly to laminated printing plates, with a metal sheet and a porous cloth completely embedded in and surrounded by a plastic.

The present method of making printing plates is slow and tedious. The prepared printing shells are inverted and subjected to molten backing material. This build up of the shell is relatively thick and after it has cooled and solidified, it then must be trimmed and planed to the correct thickness. Obviously, equipment for performing this necessary process is expensive, usually eliminating this plate preparation from the smaller shop due to the capital investment necessary. Furthermore, there are many difficulties attendant to the manufacture of the conventional printing plate. One objection is the relatively heavy weight of the finished printing plate. One reason for this is that to obtain strength in the plate it is necessary that the backing material be of maximum thickness. The backing material is, of course, exceptionally heavy due to its volume. Most backing material is approximately ninety-four percent (94%) lead, three percent (3%) tin, and three percent (3%) antimony. While the backing material is thus of a very heavy nature, it is not strong and obviously has the possible characteristic of bending. Still another problem is that the finished plates have their edges beveled and are often held to the press by inversely beveled clamp members. Obviously due to the softness of the backing material, these clamp members may penetrate the plate resulting in the plate becoming loose on the press and buckling and breaking. This combination of objections in the common printing plate places many restrictive limits on the speed at which the press may be operated. In the case of rotary presses, the weight of the plates causes centrifugal force to build up rapidly with the result that the plates tend to bend outwardly and either break or produce undesirable, irregular printing. Still another objection to the common printing plate is the time aspect. Considerable time must be taken in permitting the backing material to cool after it has been placed on the shell. While many plates are manufactured as above indicated, it is also possible to laminate printing plates (electrotypes) with plastic and sheet metal backs.

The procedure herebefore has been to take a printing shell, apply adhesive to its back, place a sheet of plastic onto the adhesive, coat the back of the plastic sheet with an adhesive, and lastly place a sheet of metal onto the last applied adhesive. While this method did produce a lightweight printing plate, it was objectionable in that, first, the metal plate might become accidentally detached from the plastic during either use or processing, and, secondly, the metal back plate did not lend itself for shaving, grinding or planing the finished printing plate into one of uniform proper thickness. However, even though by the complete embedding of a perforated metal plate within the plastic lamination, there were often imperfections in the finished printing plate due to the objectionable entrapment of air particles adjacent the back of the printing shell thereby causing poor printing by the plate when in use.

Therefore one of the principal objects of my invention is to provide a method of producing laminated printing plates that eliminates objectionable air or soft spots directly to the rear of the printing shell.

A further object of this invention is to provide a lightweight printing plate using both plastic and sheet metal that is so constructed that the metal sheet cannot become accidentally detached from the printing plate either during usage or processing.

A further object of this invention is to provide a laminated printing plate employing with plastic a metal sheet that may be easily processed for desired thickness by grinding, shaving, planing or like.

More specifically, the object of this invention is to provide a lightweight laminated printing plate incorporating a perforated tough metallic plate and a layer of cheesecloth or like wherein the metal plate and cloth are embedded in a plastic backing material.

A still further object of my invention is to provide a lightweight strong printing plate that may be produced rapidly, thereby saving in much labor, time and materials.

A still further object of my invention is to provide a method of making printing plates that requires a minimum of equipment.

These and other objects will be apparent to those skilled in the art.

My invention consists in the method of process, whereby the objects contemplated are attained as hereinafter more fully set forth, pointed out in my claims, and illustrated in the accompanying drawings, in which:

FIG. 1 is an exploded view of a printing shell, a metallic plate, a layer of cloth, and plastic sheets prior to assembly and processing;

FIG. 2 is a side view of a heated press with the printing shell, layer of fabric material, metallic plate, and layers of plastic therein the same being in the process of the heating and compressing into a printing plate;

FIG. 3 is a front plan view of my finished printing plate with sections broken away to more fully illustrate the various laminations of the same; and FIG. 4 is an enlarged cross sectional view of a portion of my finished plate.

The numeral 10 designates an ordinary printing shell having printing indicia thereon. I recommend before assembling the laminated plate that the back of this printing shell be coated with a suitable glue or adhesive 11. However, if a plastic is used that has highly sticky characteristics when heated, this step of placing an adhesive on the back of the printing shell may be dispensed with. A suitable adhesive would be Bostik 7008.

The plastic sheets that I use have been designated by the numeral 16 and may be of thermoplastic or thermosetting plastic. The plastic may be of any one of several that have been developed such as vinyl-acetate-vinyl-chloride material. The named material has excellent dimensional stability characteristics and will not shrink after it is compressed.

I have used the numeral 18 to designate the perforated metal plate having holes or perforations 22. This metal plate should be rather rigid and should be tough and strong. While I prefer that the plate be of aluminum, magnesium, or like, it may be obviously of steel, alloys of copper, zinc or like. If the plate is made of alloys of aluminum, and the finished printing plate is to have an over-all thickness of one-fourth (¼") inch, this sheet metal should be approximately one hundred twenty-five thousandths of an inch in thickness. This thickness requirement means that the aluminum alloy retains a weight advantage over sheet steel. The steel, of course, is stronger so that with a balanced press drum, the steel could be nearly as advantageous as aluminum alloy.

In general my method consists of first placing a fibrous flexible sheet of cheesecloth or like 23 adjacent the back of the printing shell 10. If an adhesive has been previously applied to the back of the printing sheel, the porous cloth or like will cling thereto. Next I place a sheet of plastic over the fibrous sheet, followed by the perforated metallic plate and then place over the back of the metallic plate another layer or sheet of plastic. If desired, and under certain circumstances, the plastic sheet between the fibrous sheet and metal sheet may be dispensed with, provided the back and outer layer of plastic sheet material is of sufficient penetrating power when heated to readily pass through the perforations of the metal sheet, the openings in the fibrous sheet and onto the back of the printing shell. In any event, regardless of whether one or two sheets of plastic are used, the plastic when heated will have a portion of its volume forced into and through the perforations of the metallic sheet thereby resulting in the successful embedding of the perforated metal sheet within the plastic body as shown in FIG. 4. The plastics that I have in mind are made molten by the application of heat. However, it is conceivable that a cold liquid plastic might be used and which would be capable of hardening either by the atmosphere or by chemical treatment. In either case the finished plate will have plastic at both sides of the perforated metal sheet, and this plastic will also be extending through the perforations of the metal sheet, and the metal sheet will be completely embedded in and form an integral part of the finished printing plate.

Many advantages are obtained by this process. With plastic at both sides of the metal sheet and extending through the perforations of the same, the metallic sheet will be bonded within the plastic material in all directions. Furthermore, by placing the tough rigid sheet member closely adjacent the printing shell, the relatively fragile printing shell will be successfully supported, and this will result in a more stable printing plate, and better printing efficiency.

From actual tests and extensive usage, the sheet of cheesecloth 23 makes possible a superior plate. Obviously by the presence of the cloth within the plastic and adjacent the printing shell, the entire unit is greatly strengthened. However, the main purpose of the use of the cheesecloth or like is that it is capable of absorbing entrapped particles of air at the back of the irregular surfaces of the printing shell. It is believed that such air particles are not only absorbed by the cheesecloth or like but the cheesecloth or like permits channels of escape for the entrapped air when the plate is heated and compressed. Obviously, the plastic by passing through the perforations of the metallic plate and through the cheesecloth or like, the same will fill up all of the irregularities of the back of the printing plate. By embedding the perforated metal sheet within the plastic, it is unnecessary to use an adhesive on the metal perforated plate to cause it to stick to the plastic. Also, with part of the plastic at the rear of the metal plate, the plate if necessary may be easily shaped by planing or grinding the back of the same, inasmuch as plastic is easier to grind, shape or plane, than metal.

This is in contrast to the herebefore method of reducing printing plates to suitable thickness by planing, shaving or grinding, the metal which herebefore was at the rear side of the printing plate. In the case of laminated plates with metal backs, there was always the hazard in accidentally dislodging the metal plate from the inner core plastic sheet, due to the resistance and toughness of the metal experienced during the planing or shaping operation. With my printing plate, however, this is impossible because, first, the plastic is relatively easy to plane and shape, and secondly, the metal plate is completely embedded in the plastic and cannot be dislodged during any process of finishing the plate after it has hardened. I further find that by my method even a lighter and stronger, and a more accurate printing plate is produced than has been herebefore possible.

Still another advantage is the rapidity with which my method produces a finished printing plate. I have referred to my finished printing plate as a laminated printing plate, but to all intents and purposes it is, when finished, a solid integral unit and therefore is capable of running off more printed copies than any printing plate yet produced.

My process of producing printing plates may be employed in the fabrication of either flat or arcuate printing plates. Any suitable heated press may be used. As herebefore indicated, the fibrous sheet is placed on the back of the printing shell, the perforated metallic plate placed in position as well as the sheet or sheets of plastic. These parts are placed in the heated press.

In the drawings I have shown the various laminations of considerable thickness, but this is only illustrative and enlarged for purposes of identification.

The adhesive, if used on the printing shell, may be any suitable glue such as: a thermosetting adhesive of the type which adheres readily and comprising essentially a phenolic resin and a polyvinyl acetate resin in the approximate ratio of 3:1 known commercially as Bostik 7008 and manufactured by the B. B. Chemical Company of Cambridge, Massachusetts.

The assembled laminations are then placed in a press 25 having the usual compressing jaws 26 and 27. These presses 25 are heated by any suitable means such as by electric resistance wires 28. These press dies are heated to approximately 300° Fahrenheit. The assembled laminations are then placed between the jaws of the press which are closed without pressure and in approximately three (3) minutes the plastic will become soft from such heating. The press is then closed with approximately one hundred (100) tons pressure until the plastic and adhesive are cured. I have already discussed the pressing of the plastic through the holes of the metal sheet. The press has limiting stops 29, so that the completed plate will be of proper predetermined thickness. The plate is then removed from the press and trimmed.

Also, my method lends itself to plate treatment or premake ready. Merely by placing a sheet of suitable material over the face area to be treated of the printing surface, i.e., between the printing face and the press, the desired results are obtained quickly and cheaply.

Some changes may be made in my method of and means for producing printing plates without departing from the real spirit and purpose of my invention, and it is my intention to cover by my claims, any modified forms of structure or use of mechanical equivalents which may be reasonably included within their scope.

I claim:

1. As a new article of manufacture a laminated printing plate unit comprising a printing shell having a printing surface on its outer face and a backing comprising a coextensive layer of plastic material disposed in spaced relation to its inner face, and a connecting means between the said shell and the said backing rigidly and permanently securing the same together, said connecting means comprising a layer of fibrous material and an adhesive, said fibrous material being superposed upon the inner face of said shell to lie substantially adjacent thereto and being adhered to said shell by said adhesive.

2. As a new article of manufacture a laminated printing plate unit according to claim 1 wherein said adhesive for uniting the fibrous layer and shell is provided by a portion of said plastic material extending through said fibrous layer.

3. As a new article of manufacture a laminated printing plate unit according to claim 1 wherein the backing also comprises a metal layer united to the laminate by said plastic material.

4. As a new article of manufacture a laminated printing plate unit in accordance with claim 3 wherein the metal layer has multiplicity of perforations and said plastic material extends into the same.

5. As a new article of manufacture a printing plate unit in accordance with claim 1 wherein said adhesive for uniting the fibrous layer and shell is provided by a portion of said plastic material and wherein said connecting means includes an adhesive additional to said layer of plastic material disposed adjacent said fibrous layer.

6. A method of making a laminated printing plate unit comprising superposing upon the inner surface of a printing shell a substantially coextensive fibrous material layer and superposing upon the latter a substantially coextensive backing comprising a plastic material layer, and applying heat and pressure to such built-up laminate and causing a portion o fthe plastic material to pass through said fibrous layer to the adjacent inner surface of the printing shell and thereby unite the inner surface of the shell and the plastic layer respectively to the intermediate fibrous material layer, the said fibrous material layer lying substantially adjacent the inner surface of the printing shell.

7. The method of making a laminated printing plate unit comprising superposing upon the inner surface of a printing shell a substantially coextensive coating of adhesive, superposing upon said coating a substantially coextensive fibrous layer and superposing upon the latter a substantially coextensive backing comprising a plastic a material layer, said plastic material layer being flowable under heat and pressure, and applying heat and pressure to such built-up laminate and causing portions of the plastic material layer and said adhesive to pass into said fibrous layer, thereby uniting said shell, fibrous layer and plastic backing layer into a unitary printing plate with the said fibrous material layer lying substantially adjacent the inner surface of the printing shell.

8. A method according to claim 6 wherein a substantially coextensive metal layer is superposed on the plastic layer and united thereto by the plastic material.

9. A method according to claim 8 wherein said metal layer is perforated and the material of said plastic layer extends into said perforations.

10. The method of making a laminated printing plate unit comprising a printing shell having a printing surface on its outer face and a backing comprising a substantially coextensive layer of plastic material disposed in spaced relation to its inner face, and a connecting means between the shell and the backing rigidly and permanently uniting the same together, said connecting means comprising a layer of fibrous material and an adhesive, said fibrous material being superposed upon the inner face of the shell to lie substantially adjacent thereto and being united to the said shell and backing by said connecting means, which method comprises superposing upon the inner surface of the printing shell a coextensive fibrous layer and superposing upon the latter a coextensive backing comprising a plastic material layer, said plastic material layer being flowable under heat and pressure, and applying heat and pressure to such built-up laminate and causing a portion of said plastic material to pass through said fibrous layer to the adjacent inner surface of the printing shell and thereby unite the inner surface of the shell and the plastic layer to the intermediate fibrous layer and form a unitary printing plate.

11. A method of making a laminated printing plate unit comprising placing between the inner surface of a printing shell and a substantially coextensive backing a connecting means therefor comprising a substantially coextensive fibrous material layer and an adhesive, and applying heat and pressure to such built-up laminate and causing portions of the adhesive to unite the inner surface of the shell and the backing respectively to the intermediate fibrous layer and form a unitary printing plate, the said fibrous material lying substantially adjacent the inner surface of the printing shell.

References Cited in the file of this patent

UNITED STATES PATENTS

| | | |
|---|---|---|
| 1,377,514 | Novotny | May 10, 1921 |
| 1,379,432 | Yeoell | May 24, 1921 |
| 1,803,548 | Drake | May 5, 1931 |
| 2,272,254 | Swan | Feb. 10, 1942 |
| 2,632,722 | Libberton | Mar. 24, 1953 |
| 2,814,990 | Myers | Dec. 3, 1957 |